June 26, 1928.
J. L. MURPHY
DEMOUNTABLE RIM
Filed May 7, 1923
1,674,788
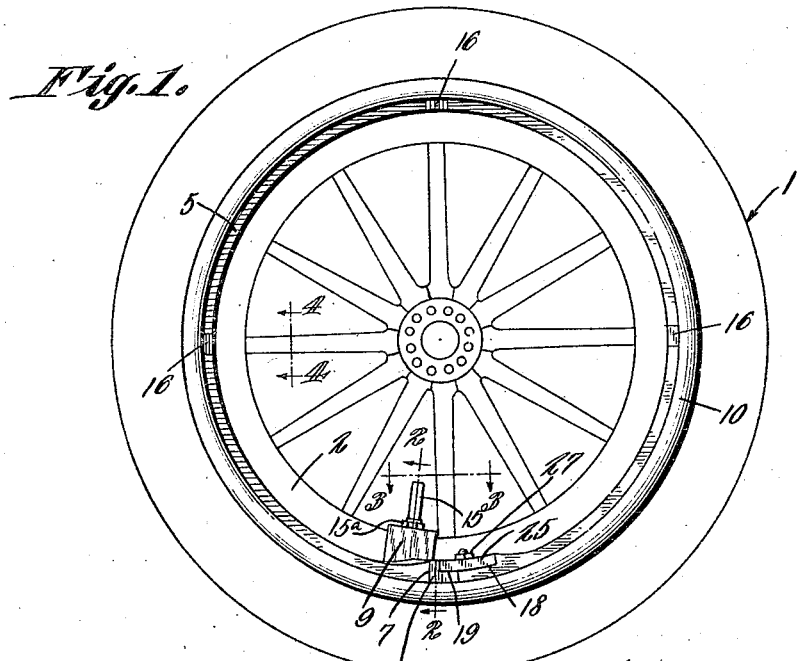
Fig. 1.
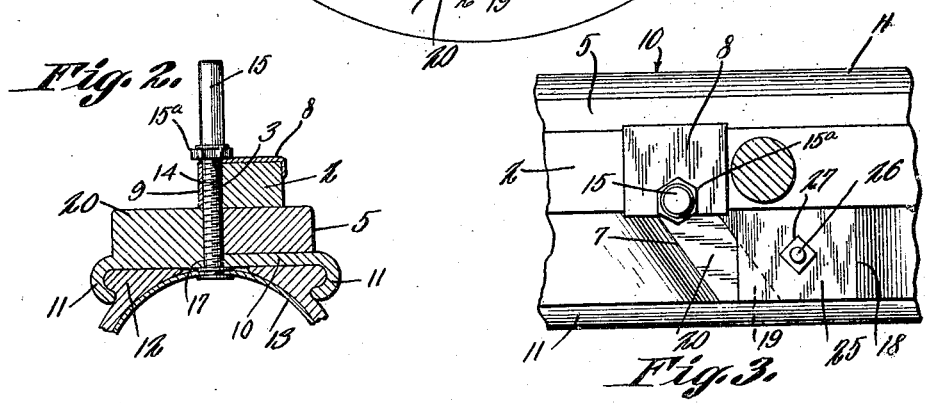
Fig. 2.
Fig. 3.
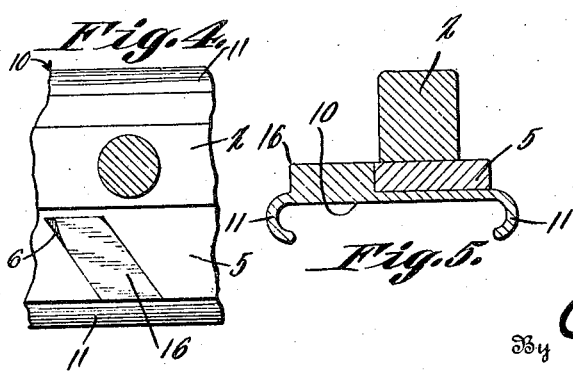
Fig. 4.
Fig. 5.
J. L. Murphy, Inventor.
By C. A. Snow & Co.
Attorneys Patented June 26, 1928.

1,674,788

UNITED STATES PATENT OFFICE.

JAMES L. MURPHY, OF MISHAWAKA, INDIANA.

DEMOUNTABLE RIM.

Application filed May 7, 1923. Serial No. 637,219.

This invention relates to a demountable rim for vehicle wheels of the type employing a felloe band made fast to the wheel felly and an outer demountable tire carrying rim which is slipped over the felloe band and secured thereto by a securing mechanism.

The object of the invention is to provide a strong and efficient felloe band of this character, the members of which are flangeless and which is equipped with a bolt and so constructed that there is no strain on the bolt and which does not require the use of a set screw.

Another object is to simplify and perfect the securing mechanism for the demountable rim and to this end said rim is provided with wedge like cam lugs which interlock with cooperating slots in the felloe band and assist in holding the demountable rim rigidly in place.

The invention further comprises novel means for interlocking the felloe band and demountable rim against relative rotary movement and the several details of construction and arrangement of parts, all of which are hereinafter more particularly described and claimed reference being had to the accompanying drawings which illustrate the preferred embodiment of the invention in which:

Figure 1 represents a side elevation of a wheel equipped with this invention.

Fig. 2 is a detail section taken on the line 2—2 of Fig. 1,

Fig. 3 is a similar view taken on the line 3—3 of Fig. 1,

Fig. 4 is a detail section taken on the line 4—4 of Fig. 1; and

Fig. 5 is a detail sectional view through the rim sections and the felly of the wheel, the tire being removed.

In the embodiment illustrated the rim constituting this invention comprises an inner felly band 5 and an outer demountable rim 10 which are arranged one within the other and detachably and interlockingly engaged by means presently to be described. The demountable rim 10 as shown is equipped with clincher flanges 11 for securing a clincher casing 12 thereto, the usual inner tube 13 being employed and equipped with the regulation valve stem 14 which is designed to extend through the tire sections and the felly 2 as is shown clearly in Fig. 2, being equipped with the usual dust cap 15 and lock nut 15ª.

The portion of the felloe band 5 which projects beyond the felly 2 is equipped with a plurality of peripherally spaced obliquely disposed slots 6 opening through one edge of said rim which are designed to receive correspondingly shaped lugs 16 carried by the inner face of the demountable rim 10. Three of these lugs are here shown although obviously any desired number may be shown and when said lugs are entered in the slots 6, the demountable rim and felloe band will be held against rotary movement relative to each other and are secured in this position by means presently to be described.

The felloe band 5 is further equipped with an elongated slot 7 which extends to a point opposite the periphery of the felly 2, said felly being cut away as shown at 3 in one side wall to receive the valve stem 14 when the tire is applied to the wheel. The reference character 8 designates a plate designed to fit over the felloe 2 and is formed with an opening in that part thereof overlying the inner perimeter of the felloe. The opening in the plate 8 registers with the slot 7 in the felloe band which in turn registers with the aperture 17 formed in the outer section 10. These registering openings accommodate the valve stem 14. This plate 8 operates to close the notch or recess in the felly 2, the flange 9 of said plate fitting down flat against the outer side edge or face of the felly and over the valve stem 14 as is shown clearly in Fig. 2.

Opening from one side wall of the slot 7 on the inner face of felloe band 5 is a recess 18 designed in connection with a recess 19 in the lug 20 of section 10 to form a seat to receive a locking plate 25 which is apertured for the passage therethrough of a bolt 26.

The lug 20 carried by the demountable rim 10 is designed to fit in the slot 7 and has its inner end concave to cooperate with the rounded end of slot 7 to receive the valve stem 14.

In the use of this demountable rim the felloe band 5 is fixedly secured to the felly 2 by rivets, bolts or otherwise with the slots 6 and 7 therein exposed so that when the outer felloe band 10 is slipped over section 5, the lugs 16 and 20 thereof will enter these slots and securely connect the demountable rim and felloe band. It is of course understood that the slot 7 receives the valve stem 14 during this assembly.

After the parts are so positioned the plate 8 is slipped over the valve stem 14 in the position shown in Fig. 2 and the lock nut 15ᵃ and dust cap 15 are applied and which operate to hold the plate in position.

The plate 25 is then placed over the bolt 26 overlying the recessed end of lug 20 and fitting snugly in the seat formed in said lug and the adjacent portion of felloe band 5 and is secured in position by a nut 27.

It will thus be seen that a rim constructed as herein shown and described may have the sections thereof quickly connected and disconnected when a tire is to be removed or be replaced by simply removing nut 27 after having first removed the dust cap 15 and the lock nut 15ᵃ from the valve stem. The demountable rim 10 carrying the tire 12 may then be slipped laterally off the felloe band 5 and another demountable rim 10 carrying an inflated tire substituted. It is of course understood that all of the wheels of the vehicle are equipped with these demountable rims and the extra tire carried is equipped with the demountable rim 10 so that it may be readily substituted for any of the others when necessary.

Various changes in the form, shape, proportion and other minor details of construction may be made without departing from the principle or sacrificing any of the advantages of the claimed invention.

I claim:—

In a wheel construction, a felloe, a felloe band secured to the felloe, a demountable rim having a portion thereof cut away to permit the demountable rim to be positioned over the felloe band, the felloe band having a plurality of spaced obliquely disposed slots extending from one edge thereof, diagonally disposed lugs of widths to closely fit within the slots formed on the demountable rim to lock the demountable rim and felloe band together, the felloe band having a valve receiving slot, one of the lugs having a recess formed adjacent to the outer end thereof and registering with a recess formed in the felloe band, a securing plate positioned in the registering recesses to further lock the felloe band and demountable together, and a bolt extending through the felloe band and plate to lock the plate in position.

In testimony that I claim the foregoing as my own, I have hereto affixed my signature.

JAMES L. MURPHY.